United States Patent Office 3,403,496
Patented Oct. 1, 1968

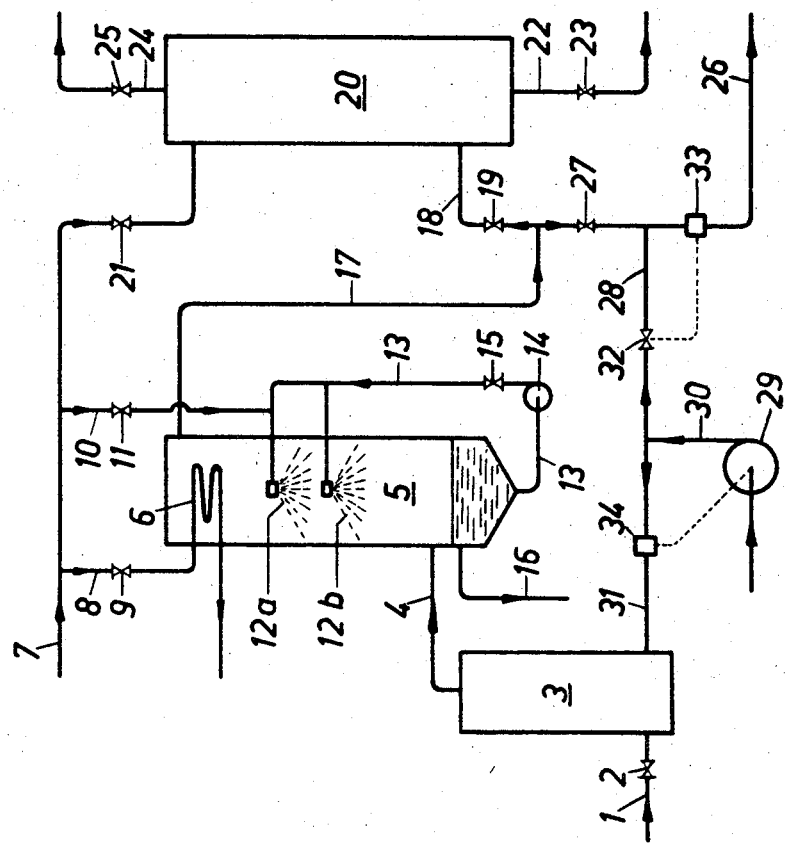

3,403,496
METHOD OF PRODUCING SO$_2$-WATER AND GAS WITH LOW SO$_2$-CONTENT FROM COMBUSTION GAS WITH HIGH SO$_2$-CONTENT
Karl-Gustav Magnus Ahlander, Uppsala, and Charles-Louis Viel Lamare, Taby, Sweden, assignors to Aktiebolaget Celleco, Stockholm, Sweden, a corporation of Sweden
Filed Mar. 29, 1967, Ser. No. 626,798
Claims priority, application Sweden, Apr. 5, 1966, 4,575/66
4 Claims. (Cl. 55—73)

ABSTRACT OF THE DISCLOSURE

The invention relates to a method of simultaneous production of SO$_2$-water and gas with comparatively low SO$_2$-content (low percent SO$_2$ gas) from combustion gas with comparatively high SO$_2$-content, said combustion gas having been obtained by the combustion of sulphur, a stream of said combustion gas after cooling being divided into one branch stream from which SO$_2$ is absorbed in water for the preparation of SO$_2$-water and a second branch stream to which diluting air is added for the preparation of diluted SO$_2$-gas. The novelty resides in the fact that the method comprises the steps of effecting said combustion, cooling, absorption and addition of diluting air at superatmospheric pressure, maintaining said pressure being together with the pressure of the streams of combustion gas by means of a stream of compressed air from a compressor, and dividing said stream of compressed air into one branch stream of air for the combustion and a second branch stream of air for the dilution.

---

The present invention relates to the production of SO$_2$-water and gas with comparatively low SO$_2$-contents (diluted SO$_2$-gas). These products have a wide use for bleaching purposes, for instance in factories such as sulphate pulp plants.

According to a previously known method to which the present invention particularly relates both products may be produced simultaneously in a plant in which a stream of combustion gas having comparatively high SO$_2$-contents and obtained by the combustion of sulphur with little excess of air is cooled as a first step and subsequently divided into one branch stream from which SO$_2$ is absorbed in water to form SO$_2$-water, and a second branch stream to which diluting air is added to form diluted SO$_2$-gas, the flow of the combustion gas and the addition of diluting air being maintained by suction from SO$_2$-gas pumps in the gas exit conduits of the plant.

Thereby the whole of this process is run at sub-pressure which causes problems both with regard to cooling and efficient absorption. Moreover, for several reasons the gas pumps already mentioned constitute very expensive elements of the plant equipment. For one thing, they cannot operate without the use of sealing water which leads to considerable loss of SO$_2$ unavoidably absorbed in this water. Secondly, even though they may be constructed in expensive corrosion-proof material said pumps become rapidly worn and must be replaced. Besides, they are very power-consuming.

The object of the invention is to improve upon this system. The invention is primarily characterised by the fact that combustion, cooling, absorption and addition of diluting air are carried out at superatmospheric pressure maintained, as is the superatmospheric pressure of the combustion gas, by the stream of compressed air from a compressor being divided into one branch stream of air for the combustion and a second branch stream of air for the dilution.

By this means there are gained not only the advantages of efficient cooling and absorption inherent in carrying out the process at superatmospheric pressure, but also the substitution of one single air compressor for the expensive SO$_2$-gas pumps. This means improved economy.

The invention will be more fully explained by reference to the accompanying drawing which illustrates in the form of a flow sheet one example of a plant for carrying the invention into effect. The plant is run in the following manner:

Molten sulphur supplied through the pipe line 1 provided with a regulating valve 2 is burnt at a pressure of for instance 1.5 atmospheres or more in a furnace 3. The combustion gases which contain, for example, about 19% SO$_2$ are withdrawn through a line 4 at a temperature of, for example, about 1250° C. to a cooling tower 5 which incorporates a cooling system comprising an indirect cooler 6 the cooling water of which is supplied from a main line 7 and a line 8 provided with a regulating valve 9 and below the latter a direct cooling system by means of which cooling water supplied from the same main line through a line 10 containing a regulating valve 11 is sprayed in the tower in the form of showers 12a and 12b, circulation meanwhile being maintained through a circulation line 13 equipped with a circulation pump 14 and a regulating valve 15.

The hot gas is supplied to the cooling tower at the lower end of the latter, and will first contact the showers so as to become saturated, while still at pressure, with water which will evaporate while undergoing itself a reduction of temperature to an equilibrium of, for example, about 100° C. corresponding to the prevailing pressure, the circulating cooling water being heated simultaneously to the same temperature. At a temperature level of such height the absorption of SO$_2$ in the cooling water is so insignificant that from a practical point of view no important or even measureable loss of SO$_2$ will occur in this way, the reason being that only a small quantity of cooling water need be added for the saturation process for practical reasons through line 10, and this additional cooling water will again be discharged from the system through the overflow 16. As the saturated gas subsequently is cooled to a final temperature of, for instance, about 50° C. in the indirect cooler situated above the circulation system, without causing any loss of SO$_2$, the condensate thus separated from the gas may flow back directly to the circulating water inside the cooling tower without any special pumping system being required for this purpose. Such a system would necessarily cost a great deal of money and would present many operating problems owing to the condensate being so highly corrosive.

To cool directly the pressurized gas a pressure all the way down to a final temperature of about 50° C. would, on the other hand, lead to wholly unacceptable losses of SO$_2$ with the great quantities of cooling water having to pass through the tower, and this cooling water would be highly SO$_2$ absorbent at the pressure and low temperature prevailing in these circumstances. The proposed method of cooling constitutes, therefore, an essential step of the invention.

The cooled combustion gases, still highly concentrated in SO$_2$, leave the cooler via a conduit 17 and are conducted in part through a conduit 18 having a regulating valve 19 to an absorption tower 20 where the SO$_2$ content of the gases still at superatmospheric pressure is absorbed almost fully in water supplied to the same absorption tower via the conduit 7 and the regulating valve 21. The SO$_2$-water thus formed and the gas free from SO$_2$ are led out of the system through a conduit 24 with a regulating valve 23 and a conduit 26 with a regulating valve 25, respectively. The remainder of the combustion gases is led out of the system via a conduit 26 with a regulating valve 27, the gases being at the same time mixed with diluting air via a conduit 28 to a $SO_2$-content of about 10% suitable for use, for example, in a $ClO_2$-plant or other suitable consumer plant, not shown in the drawing.

The pressure in the combustion kiln governs entirely the pressure in the remainder of the plant as well as the flow of gas through the plant, said pressure being maintained by means of a compressor 29 supplying the air of combustion at the required pressure via conduits 30 and 31 to the combustion furnace 3. The same compressor also supplies the air of dilution through conduit 28. This dual function of the compressor sets up a special control problem.

For steady combustion a steady supply of the air of combustion is preferable. Yet, the bulk supply of the air of combustion which also is constant may be divided from conduit 17 to the conduits 18 and 26, respectively, in proportions that may vary greatly with varying requirements of $SO_2$-water. For the dilution of a varying flow of gas through conduit 26 to a constant $SO_2$-content there are required in consequence varying quantities of diluting air, i.e., varying quantities of compressed air from the compressor, this diluting air being divided into a constant quantity through the conduit 31 and into a quantity through conduit 28 that is varying in a manner so as to maintain the afore-said constant $SO_2$-content.

According to the present invention this problem is solved by providing the conduit 28 adapted to open or close a regulating valve 32 by means of impulses from a gas analyser 33 in conduit 26 as the $SO_2$-concentration in this conduit tends to exceed respectively to fall below the desired value, and by providing a gas meter 34 in the conduit 31 to emit impulses to increase or reduce, respectively, the speed of the compressor as the volume of the air of combustion tends to decrease, respectively to increase.

A particularly suitable principle of combustion in the present circumstances is disclosed in British Patent No. 838,208 according to which a preliminary combustion takes place in a vortex tube followed in a final combustion in a fluidized bed that may be operated with very little excess air, resulting in a high $SO_2$-content in the combustion gases. The absorption being greatly facilitated by being carried out at pressure, an ordinary packed tower with a spray-nozzle device for the water may be employed.

Modifications of the arrangement shown in the drawing and described in the foregoing may be carried out within the scope of the invention by anyone skilled in the art.

What we claim is:

1. The method of simultaneous production of $SO_2$-water and gas with comparatively low-percent $SO_2$-gas from combustion gas with comparatively high $SO_2$-content, said combustion gas having been obtained by the combustion of sulphur, a stream of said combustion gas after cooling being divided into one branch stream from which $SO_2$ is absorbed in water for the preparation of $SO_2$-water and a second branch stream to which diluting air is added for the preparation of diluted $SO_2$-gas, said method comprising the steps of effecting said combustion, cooling, absorption and addition of diluting air at superatmospheric pressure, maintaining said pressure together with the pressure of the streams of combustion gas by means of a stream of compressed air from a compressor, and dividing said stream of compressed air into one branch stream of air from the combustion and a second branch stream of air for the dilution.

2. Method according to claim 1 in which the $SO_2$-content of said diluted $SO_2$-gas is maintained constant by increasing or decreasing, respectively, the quantity of diluting air by means of an impulse from a meter of said $SO_2$-content as said $SO_2$-content tends to exceed respectively to fall below a predetermined value, said quantity of combustion air being simultaneouly maintained constant by increasing or decreasing, respectively, the quantity of said compressed air from the compressor by means of an impulse from a meter of the quantity of said air of combustion as said quantity tends to fall below respectively to exceed a predetermined value.

3. Method according to claim 2 in which the quantity of compressed air from said compressor is caused to increase respectively to decrease, by increasing or decreasing, respectively, the speed of said compressor.

4. Method according to claim 1 in which the combustion gases from the combustion of sulphur are cooled at superatmospheric pressure in two consecutive steps, said combustion gases being in the first cooling step directly in contact with finely divided sprayed cooling water in circulation, thereby causing said cooling water to evaporate to an extent corresponding to the quantity of water consumed in the saturation and absorption of said gases, said combustion gases subsequently to their cooling and saturation in said first cooling step to the equilibrium temperature of the saturation being further cooled indirectly against the cooling surface of an indirect cooler, and in which the condensate separated from the gases in said second cooling step is caused by its own weight to rejoin said circulating cooling water by reason of said second cooling step being situated at a higher level than said first cooling step.

References Cited

UNITED STATES PATENTS

| | | | |
|---|---|---|---|
| 1,724,421 | 8/1929 | Richter | 55—73 |
| 1,821,064 | 9/1931 | Skogmark et al. | 55—73 |
| 2,249,193 | 7/1941 | Titlestad | 23—180 |

REUBEN FRIEDMAN, *Primary Examiner.*

C. N. HART, *Assistant Examiner.*